United States Patent
Miyamoto et al.

(10) Patent No.: US 6,261,351 B1
(45) Date of Patent: Jul. 17, 2001

(54) WATER BASED INK FOR BALL POINT PEN

(75) Inventors: Masaru Miyamoto; Shigeru Miyazaki; Yoji Takeuchi, all of Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/530,506

(22) PCT Filed: Nov. 20, 1998

(86) PCT No.: PCT/JP98/05240

§ 371 Date: Apr. 27, 2000

§ 102(e) Date: Apr. 27, 2000

(87) PCT Pub. No.: WO99/28398

PCT Pub. Date: Jun. 10, 1999

(30) Foreign Application Priority Data

Dec. 1, 1997 (JP) .................................................. 9-330125

(51) Int. Cl.$^7$ .................................................. C09D 11/16
(52) U.S. Cl. .................................. 106/31.36; 106/31.58; 106/31.68; 106/31.86; 106/31.69; 106/31.37
(58) Field of Search ................................ 106/31.36, 31.58, 106/31.37, 31.38, 31.68, 31.86, 31.69, 31.71

(56) References Cited

U.S. PATENT DOCUMENTS

| | | | | |
|---|---|---|---|---|
| 4,986,850 | * | 1/1991 | Iwata et al. | 106/31.58 |
| 5,143,546 | * | 9/1992 | Yuasa et al. | 106/31.58 |
| 5,180,425 | * | 1/1993 | Matrick et al. | 106/31.86 |
| 5,281,262 | * | 1/1994 | Saito | 106/31.58 |
| 5,356,464 | * | 10/1994 | Hickman et al. | 106/31.58 |
| 5,656,071 | * | 8/1997 | Kappele et al. | 106/31.76 |

FOREIGN PATENT DOCUMENTS

| | | |
|---|---|---|
| 62-101672 | 5/1987 | (JP) . |
| 5-186730 | 7/1993 | (JP) . |
| 6-73323 | 3/1994 | (JP) . |
| 7-216284 | 8/1995 | (JP) . |
| 8-12916 | 1/1996 | (JP) . |
| 10-195364 | 7/1998 | (JP) . |
| WO 99/02617 | 1/1999 | (WO) . |

* cited by examiner

*Primary Examiner*—Helene Klemanski
*Assistant Examiner*—Veronica F. Faison
(74) *Attorney, Agent, or Firm*—Darby & Darby

(57) ABSTRACT

An action of the preventing drying at a pen tip without using water-soluble organic solvents such as glycols, glycerin and glycol ethers which have so far been used for a water based ink for a ball point pen is allotted to at least one selected from the group consisting of a reducing sugar comprising maltitol as a principal component, a reducing sugar comprising sorbitol as a principal component, reducing dextrin, reducing maltodextrin, α-cyclodextrin, β-cyclodextrin and maltosylcyclodextrin, and the actions of inhibiting feathering of the drawn lines, improving discharge stability of the ink and maintaining the lubricity are allotted to at least one selected from the group consisting of an alkylene oxide adduct of polyglycerin, an alkylene oxide adduct of glycerin and an alkylene oxide adduct of trimethylolpropane. Further, a viscosity-controlling agent is added thereto to thereby prepare a water based ink for a ball point pen which has feathering resistance, good writing feeling and high discharge stability and which is excellent in drying prevention effect at a pen tip.

2 Claims, No Drawings

WATER BASED INK FOR BALL POINT PEN

TECHNICAL FIELD

The present invention relates to a water based ink for a ball point pen.

BACKGROUND ART

Water based inks have so far had the problem that if moisture thereof is evaporated, for example, dissolved substances and dispersed components contained in the inks are concentrated, deposited, dried and solidified to bring about clogging at the tips of the writing instruments and to increase a viscosity of the inks, thereby causing troubles in writing.

In this connection, it is proposed to add to a water based ink for a ball point pen, scarcely volatile dye-solubilizing agents or dye-dissolving aids such as urea, thiourea, polyhydric alcohols or derivatives thereof, tetrahydrofurfuryl alcohol, 4-methoxy-4-methylpentane-2-one, ethylene oxide adducts of p-toluenesulfonamide and thiodiethanolalkynolamine.

However, these urea, thiourea and polyhydric alcohols have not been able to provide satisfactory water based inks because of the reasons that they have an insufficient drying prevention effect or they have toxicity and are unsuitable for additives and that they allow a viscosity of the ink to grow large to bring about inferior follow-up of the ink.

Proposed in Japanese Patent Application NO. 9-181391 by the present applicant was a pseudoplastic water based ink for a ball point pen comprising a colorant, water, a water-soluble organic solvent and a viscosity-controlling agent and reducing dextrin or reducing maltodextrin. These inks using a water-soluble organic solvent such as glycols, glycerin and glycol ethers are increased in feathering of the drawn lines. Further, they do not provide sufficient lubricity, so that a ball point pen using them is increased in frictional resistance between the ball and the ball housing to abrade the ball housing and therefore has the defect that the writing property is notably reduced, such that the ball sinks and the ink is discharged unevenly.

Further, proposed in Japanese Patent Application Laid-Open No. 8-12916 is an ink comprising titanium oxide, a thickening water-soluble resin, a binder, a sugar alcohol and water, wherein a viscosity value is 6,000 to 50,000 mPa·s, and a viscosity index obtained according to a difference in a revolution of a viscometer is 2 or more. However, even an ink having such a high viscosity index does not solve the problems of a follow-up property in quick writing and splitting of the drawn lines. Further, it contains only a white pigment as a colorant and has the problem that a marking ability is inferior.

Further, it is proposed in Japanese Patent Application Laid-Open No. 5-186730 to add an alkylene oxide adduct of polyglycerin in order to improve feathering. However, though the adding of the alkylene oxide adduct of polyglycerin improves the feathering resistance and the writing feeling, the drying prevention effect at a pen tip is not provided. Accordingly, there remains unsolved the problem that when the pen is left standing with the cap off, moisture is vaporized from the pen tip and the pen tip is dried, so that the writing property is reduced.

An object of the present invention is to solve the problems described above, that is, to provide a water based ink for a ball point pen which is good in feathering resistance and writing feeling and has high discharge stability of the ink and which is excellent in a drying prevention effect at a pen tip.

DISCLOSURE OF THE INVENTION

Intensive researches continued by the present inventors in order to solve the problems described above have resulted in finding that the part of the preventing of drying at a pen tip which has so far been an action exerted by water-soluble organic solvents is allotted to at least one selected from the group consisting of a reducing sugar comprising maltitol as a principal component, a reducing sugar comprising sorbitol as a principal component, reducing dextrin, reducing maltodextrin, α-cyclodextrin, β-cyclodextrin and maltosylcyclodextrin without using water-soluble organic solvents such as glycols, glycerin and glycol ethers which have so far been used for a water based ink for a ball point pen, and the parts of actions to inhibit feathering of the drawn lines, to improve a discharge stability of the ink and to maintain the lubricity are allotted to at least one selected from the group consisting of an alkylene oxide adduct of polyglycerin, an alkylene oxide adduct of glycerin and an alkylene oxide adduct of trimethylolpropane, whereby the respective effects are improved more markedly than ever, and a synergistic effect of raising the stability with the passage of time is produced.

BEST MODE FOR CARRYING OUT THE INVENTION

A reducing sugar comprising maltitol as a principal component, a reducing sugar comprising sorbitol as a principal component, reducing dextrin, reducing maltodextrin, α-cyclodextrin, β-cyclodextrin and maltosylcyclodextrin which are used in the present invention are sugars which are generally used as edible sweetenings and which are non-toxic and safe and have the characteristics that they have high solubility in water and very excellent water retention.

Further, a water based ink for a writing instrument containing these compositions is safe and not varied in a viscosity and a pH with the passage of time and makes it possible to improve the writing feeling and the drying resistance. Further, they do not exert an adverse effect on ink composition materials generally used and do not change a hydrogen ion concentration in the ink, so that they do not exert an adverse effect as well on anionic and cationic materials and therefore have the advantage that a colorant can be optionally selected from all water based dyes and organic or inorganic pigments.

With respect to a content of a reducing sugar comprising maltitol as a principal component, a reducing sugar comprising sorbitol as a principal component, reducing dextrin, reducing maltodextrin, α-cyclodextrin, β-cyclodextrin and maltosylcyclodextrin in the ink in the present invention, at least one of them is added in an amount of 0.5 to 20% by weight based on the total amount of the ink. If the content is smaller than 0.5% by weight, the effect of the drying resistance is reduced, and if it is more than 20% by weight, the spinnability is intensified to reduce the writing feeling.

On the other hand, at least one selected from the group consisting of an alkylene oxide adduct of polyglycerin, an alkylene oxide adduct of glycerin and an alkylene oxide adduct of trimethylolpropane, and a mixture thereof have a purpose to elevate the feathering resistance and the lubricity and to improve the discharge stability of the ink, and the combination of blending with the reducing sugar and the reducing dextrin described above produces a synergistic effect of raising the drying resistance at a pen tip (hereinafter referred to as a non-drying property) and the stability with the passage of time. A content thereof is 0.5 to 40% by weight, more preferably 5 to 20% by weight based on the whole composition.

There can be used as the colorant all dyes which are soluble or dispersed in water, and all pigments such as titanium oxide, publicly known inorganic and organic pigments, pseudo-pigments obtained by coloring resin emulsions with dyes, and white plastic pigments.

Specific examples thereof include acid dyes such as Eosine, Phloxine, Water Yellow #6-C, acid red, Water Blue #105, Brilliant Blue FCF and Nigrosine NB, direct dyes such as Direct Black 154, Direct Sky Blue 5B and Violet BB, and basic dyes such as Rhodamine and Methyl Violet.

Inorganic pigments include, for example, carbon black and metal powders.

Organic pigments include, for example, azo lake, insoluble azo pigments, chelate azo pigments, phthalocyanine pigments, perylene and perinone pigments, anthraquinone pigments, quinacridone pigments, dye lakes, nitro pigments and nitroso pigments.

To be specific, included are inorganic pigments such as carbon black, titanium black, zinc oxide, red iron oxide, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder;

C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Orange 5, C. I. Pigment Orange 13, C. I. Pigment Orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

The use amount of the colorant is preferably 0.1 to 30% by weight based on the total amount of the ink.

Acryl base synthetic polymers, natural gums, cellulose and polysaccharides can be used as the viscosity-controlling agent.

Included are products on the market such as, for example,

"Junron PW-111" manufactured by Nippon Pure Chemicals Ind. Co., Ltd.,

"Hiviswako 104" manufactured by Wako Pure Chemical Industries, Ltd.,

"KELZAN", "KELZAN AR", "KIA96", "KIA112", "RHEOZAN" AND "K7C233" manufactured by Sansho Co., Ltd., "JUGAR HP-8", "JUGAR HP-60", "RHODOPOL23" and "RHODOPOL50MC" manufactured by Rhone Poulenc Japan, Ltd., and "Echo Gum GH" manufactured by Dainippon Pharmaceutical Co., Ltd.

The content thereof is suitably increased or decreased depending on the viscosity of the ink.

If the ink composition of the present invention has a viscosity of 4,000 mPa·s or more at a low shearing rate, the discharge amount of the ink in writing is reduced, and therefore such a viscosity is not preferred.

Accordingly, it is effective that the viscosity at a shearing rate of 3.84 $s^{-1}$ falls in a range of 200 to 4,000 mPa·s, preferably 300 to 3,000 mPa·s and more preferably 600 to 2,500 mPa·s.

The range of the shearing rate which can be applied to a conventional rotary type viscometer is 1.92 to 3.84 $s^{-1}$, and in the present invention, a measured value at 3.84 $s^{-1}$ shall be employed considering a stability of the measured value.

In addition thereto, there can suitably be selected and used, if necessary, dispersants (water-soluble polymers, etc.) for pigments, pH adjusting agents such as ammonia, urea, monoethanolamine, diethanolamine, triethanolamine, alkali metal salts of carbonic acid and phosphoric acid such as sodium tripolyphosphate and sodium carbonate, and hydroxides of alkali metals such as sodium hydroxide;

preservatives or fungicides such as phenol, sodium omadine, sodium pentachlorophenol, 1,2-benzisothiazoline-3-one, 2,3,5,6-tetrachloro-4-(methylsulfonyl)pyridine, alkali metal salts of benzoic acid, sorbic acid and dehydroacetic acid such as sodium benzoate, and benzimidazole base compounds;

rust preventives such as benzotriazole, dicyclohexylammonium nitrite, diisopropylammonium nitrite and tolyltriazole;

derivatives of polyoxyethylene, polyoxypropylene or polyoxyethylenepolyoxypropylene such as polyoxyethylene lauryl ether, sorbitan derivatives such as sorbitan monooleate, and surfactants having fluorinated alkyl groups such as perfluoroalkylphosphoric acid esters; and lubricants, wetting agents and defoaming agents such as polyether-modified silicones including polyethylene glycol adducts of dimethylpolysiloxane.

EXAMPLES

The present invention shall more specifically be explained below with reference to examples, but the present invention shall by no means be restricted by these examples.

Blending proportions in the examples and the comparative examples and the evaluation results of inks produced based on the formations are shown in Table 1 and Table 2. Water based inks for a ball point pen shown in the respective examples and comparative examples were obtained by stirring the respective compositions and then filtering them.

(1) Blending Feature of Example 1

Black ink

Maltitol

Propylene oxide 4 moles adduct of diglycerin (2) Blending Feature of Example 2

Blue ink

Reducing dextrin

Ethylene oxide 4 moles adduct of diglycerin (3) Blending Feature of Example 3

Black ink

Sorbitol

Propylene oxide 13 moles adduct of diglycerin (4) Blending Feature of Example 4

Blue ink

Maltosylcyclodextrin

Ethylene oxide 13 moles adduct of diglycerin
Propylene oxide 10 moles adduct of triglycerin
(5) Blending Feature of Example 5
  Blue ink
  Titanium oxide
  Reducing dextrin
  Propylene oxide 4 moles adduct of diglycerin
  Ethylene oxide 13 moles adduct of diglycerin
  Viscosity-controlling agent (xanthan gum) 0.3% by weight
(6) Blending Feature of Comparative Example 1
  Glycerin was blended in place of maltitol and the propylene oxide 4 moles adduct of diglycerin in Example 1.
  Black ink
  Glycerin
(7) Blending Feature of Comparative Example 2
  Reducing dextrin in Example 2 was removed.
  Blue ink
  Propylene oxide 4 moles adduct of diglycerin
(8) Blending Feature of Comparative Example 3
  Glycerin was blended in place of the propylene oxide 4 moles adduct of diglycerin in Example 1.
  Black ink
  Maltitol
  Glycerin
(9) Blending Feature of Comparative Example 4
  Maltosylcyclodextrin of Example 4 was removed, and 5.0% by weight of urea was blended.
  Blue ink
  Ethylene oxide 13 moles adduct of diglycerin
  Propylene oxide 10 moles adduct of triglycerin
  Urea Nine kinds of the inks obtained in the examples and the comparative examples described above were used to carry out the following tests, and the results described in Table 1 and Table 2 were obtained.

Evaluation Standards:
(1) Ink Viscosity:
  The viscosity was measured by means of an EMD type viscometer at a shearing rate of 3.84 sol within a week after preparing the ink.
(2) Feathering Resistance:
  The inks obtained in the respective formations were charged respectively into ball point pens having a ball diameter of 0.7 mm, and "spiral writing" was carry out on writing paper to evaluate a feathering state of the drawn lines with eyes according to the following criteria:
  ○: no feathering observed and distinct writings
  Δ: feathering observed and indistinct writings
  X: marked feathering observed and very indistinct writings
(3) Non-drying Property:
  The inks obtained in the respective formations were charged respectively into ball point pens having a ball diameter of 0.7 mm, and the ball point pens were left standing sideways with the caps off in a constant temperature chamber at 25° C. and a humidity of 65%. "Spiral writing" was carry out on writing paper after 2 weeks and one month respectively to evaluate a grade of the drawn lines according to the following criteria:
  ○: the drawn lines have no starving and can be written well
  ○': the drawn lines have slight starving and can be written almost well
  Δ: the drawn lines have marked starving, and scratching is caused in writing
  X: hardly capable of writing
(4) Writing Feeling:
  The inks obtained in the respective formations were charged respectively into ball point pens having a ball diameter of 0.7 mm, and "spiral writing" was carry out on writing paper to evaluate the writing feeling according to the following criteria:
  ○: smooth and stable writing feeling
  Δ: stiff and hard writing feeling
  X: stiff and hard writing feeling, and skip and directional error are observed
(5) Ink Discharge Stability:
  The inks obtained in the respective formations were charged respectively into ball point pens having a ball diameter of 0.7 mm, and "spiral writing" was carry out on writing paper up to exhaustion of the ink by menas of a write test machine to evaluate the ink discharge stability according to the following criteria:
  ○: possible of writing at a stable discharge rate up to exhaustion of the ink
  Δ: discharge rate is decreased or increased in the middle of writing and stable writing is impossible
  X: incapable of writing in the middle of writing
(6) Ink Follow-up Property:
  The inks obtained in the respective formations were charged respectively into ball point pens having a ball diameter of 0.7 mm, and "spiral writing" was carry out on writing paper at a twice rate as quick as usual to evaluate a grade of the drawn lines according to the following criteria:
  ○: the drawn lines have no starving and can be written well
  Δ: the drawn lines have slight starving
  X: hardly capable of writing

TABLE 1

| | Example | | | | |
|---|---|---|---|---|---|
| | 1 | 2 | 3 | 4 | 5 |
| Carbon black | 8.0 | | 8.0 | | |
| Phthalocyanine blue | | 7.5 | | 7.5 | 0.2 |
| Titanium oxide | | | | | 22.0 |
| Styrene-maleic acid resin ammonium salt | 3.0 | | | | 1.5 |
| Styrene-acrylic acid resin ammonium salt | | 2.5 | 3.0 | 2.5 | 0.5 |
| Maltitol | 4.0 | | | | |
| Sorbitol | | | 2.0 | | |
| Reducing dextrin | | 3.0 | 2.0 | | 4.0 |
| Maltosylcyclodextrin | | | | 5.0 | |
| Propylene oxide 4 mole adduct of diglycerin | 15.0 | 15.0 | | | 5.0 |
| Ethylene oxide 13 mole adduct of diglycerin | | | 13.0 | 5.0 | 7.0 |
| Propylene oxide 10 mole adduct of triglycerin | | | | 5.0 | |
| Potash soap | 0.3 | 0.3 | 0.3 | 0.3 | 0.3 |
| Glycerin | | | | | |
| Urea | | | | | |
| Viscosity-controlling agent (acryl base synthetic polymer) | 0.3 | 0.3 | 0.3 | 0.3 | |
| Viscosity-controlling agent (xanthan gum) | | | | | 0.3 |
| Aminomethylpropanol | 0.3 | 0.3 | 0.3 | 0.3 | 0.3 |
| Bioden | 0.2 | 0.2 | 0.2 | 0.2 | 0.2 |
| Benzotriazole | 0.2 | 0.2 | 0.2 | 0.2 | 0.2 |

TABLE 1-continued

|  | Example | | | | |
| --- | --- | --- | --- | --- | --- |
|  | 1 | 2 | 3 | 4 | 5 |
| Ion-exchanged water | Balance | Balance | Balance | Balance | Balance |
| Total | 100.0 | 100.0 | 100.0 | 100.0 | 100.0 |
| Ink viscosity 3.84 s$^{-1}$ (mPa.s) | 700 | 500 | 700 | 600 | 2500 |
| Feathering resistance | ○ | ○ | ○ | ○ | ○ |
| Non-drying property 25° C. 65% | | | | | |
| 2 weeks | ○ | ○ | ○ | ○ | ○ |
| one month | ○ | ○ | ○ | ○' | ○' |
| Writing feeling | ○ | ○ | ○ | ○ | ○ |
| Abrasion of ball housing after writing | None | None | None | None | None |
| Viscosity change after one month at 50° C. | None | None | None | None | None |
| Ink discharge stability | ○ | ○ | ○ | ○ | ○ |
| Ink follow-up property | ○ | ○ | ○ | ○ | ○ |

TABLE 2

|  | Comparative Example | | | |
| --- | --- | --- | --- | --- |
|  | 1 | 2 | 3 | 4 |
| Carbon black | 8.0 |  | 8.0 |  |
| Phthalocyanine blue |  | 7.5 |  | 7.5 |
| Titanium oxide |  |  |  |  |
| Styrene-maleic acid resin ammonium salt | 3.0 |  |  |  |
| Styrene-acrylic acid resin ammonium salt |  | 2.5 | 3.0 | 2.5 |
| Maltitol |  |  | 4.0 |  |
| Sorbitol |  |  |  |  |
| Reducing dextrin |  |  |  |  |
| Maltosylcyclodextrin |  |  |  |  |
| Propylene oxide 4 mole adduct of diglycerin |  | 15.0 |  |  |
| Ethylene oxide 13 mole adduct of diglycerin |  |  |  | 5.0 |
| Propylene oxide 10 mole adduct of triglycerin |  |  |  | 5.0 |
| Potash soap | 0.3 | 0.3 | 0.3 | 0.3 |
| Glycerin | 15.0 |  | 15.0 |  |
| Urea |  |  |  | 5.0 |
| Viscosity-controlling agent (acryl base synthetic polymer) | 0.3 | 0.3 | 0.3 | 0.3 |
| Viscosity controlling agent (xanthan gum) |  |  |  |  |
| Aminomethylpropanol | 0.3 | 0.3 | 0.3 | 0.3 |
| Bioden | 0.2 | 0.2 | 0.2 | 0.2 |
| Benzotriazole | 0.2 | 0.2 | 0.2 | 0.2 |

TABLE 2-continued

|  | Comparative Example | | | |
| --- | --- | --- | --- | --- |
|  | 1 | 2 | 3 | 4 |
| Ion-exchanged water | Balance | Balance | Balance | Balance |
| Total | 100.0 | 100.0 | 100.0 | 100.0 |
| Ink viscosity 3.84 s$^{-1}$ (mPa.s) | 650 | 500 | 600 | 900 |
| Feathering resistance | Δ | ○ | Δ | ○ |
| Non-drying property 25° C. 65% | | | | |
| 2 weeks | X | Δ | ○ | ○ |
| one month | X | Δ | Δ | X |
| Writing feeling | Δ | Δ | Δ | Δ |
| Abrasion of ball housing after writing | Present | None | Present | None |
| Viscosity change after one month at 50° C. | Up | None | Up | None |
| Ink discharge stability | Δ | ○ | Δ | Δ |
| Ink follow-up property | ○ | ○ | ○ | ○ |

Industrial Applicability

The water based ink of the present invention used for a ball point pen provides good writing feeling as well as high discharge stability of the ink, and is excellent in a drying prevention effect at a pen tip.

What is claimed is:

1. A water based ink for a ball point pen comprising 0.5 to 20% by weight based on the total composition, of at least one selected from the group consisting of a reducing sugar comprising maltitol as a principal component, a reducing sugar comprising sorbitol as a principal component, reducing dextrin, reducing maltodextrin, α-cyclodextrin, β-cyclodextrin and maltosylcyclodextrin and 0.5 to 40% by weight based on the total composition, of at least one selected from the group consisting of an alkylene oxide adduct of polyglycerin, an alkylene oxide adduct of glycerin and an alkylene oxide adduct of trimethylolpropane, and further comprising a colorant, a viscosity-controlling agent and water.

2. The water based ink for a ball point pen as described in claim 1, comprising at least one selected from the group consisting of synthetic polymers, natural gums, cellulose and polysaccharides as the viscosity-controlling agent, wherein the viscosity at a shearing rate of 3.84 so$^{-1}$ falls in a range of 200 to 4,000 mPa·s.

* * * * *